April 23, 1929.    R. M. BARBOUR ET AL    1,710,444
FURNACE
Filed Aug. 20, 1927    3 Sheets-Sheet 1

INVENTORS
Rolland M. Barbour
Henry H. Knipe,
BY
ATTORNEY.

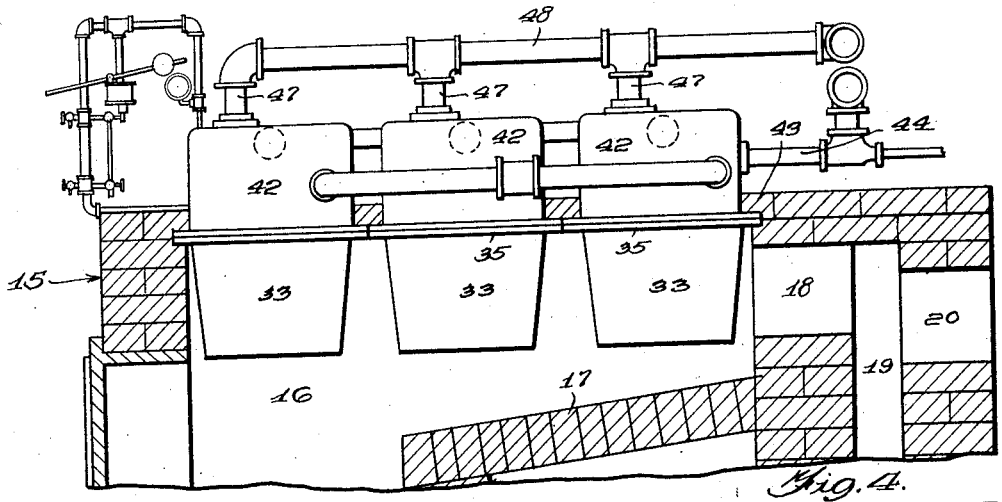
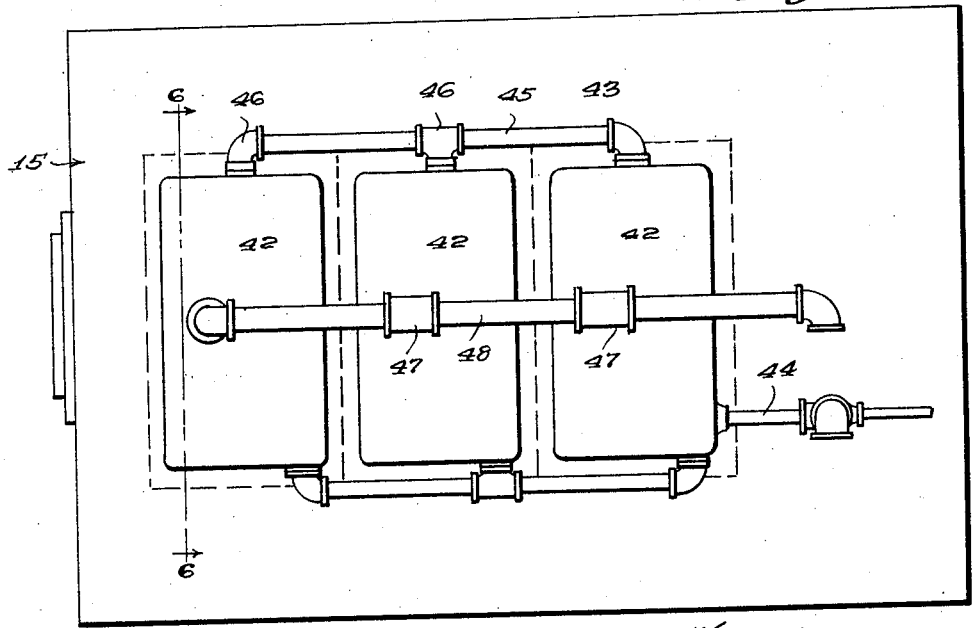
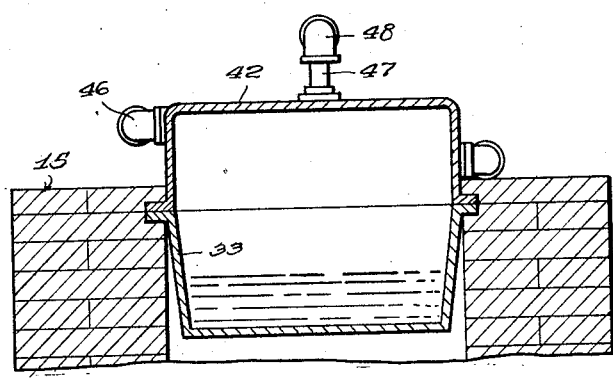

April 23, 1929.  R. M. BARBOUR ET AL  1,710,444

FURNACE

Filed Aug. 20, 1927  3 Sheets-Sheet 3

INVENTORS
Rolland M. Barbour,
BY Henry H. Knipe,

ATTORNEY.

Patented Apr. 23, 1929.

1,710,444

UNITED STATES PATENT OFFICE.

ROLLAND M. BARBOUR AND HENRY H. KNIPE, OF LAWRENCEVILLE, ILLINOIS.

FURNACE.

Application filed August 20, 1927. Serial No. 214,326.

The present invention relates to furnaces, adapted for heating buildings.

In accordance with our invention, we provide a furnace, embodying a furnace shell or casing, in the upper portion of which are mounted any suitable number of drums or tanks. These drums may contain water, air, or other fluid to be heated. The drums are arranged within the furnace casing in a manner whereby the heated gases or products of combustion will circulate exteriorly of the same, for effecting the maximum heat exchange. The drums are so arranged in the furnace casing that their tops are completely covered, while all other surfaces of the drums are surrounded by the heated gases or products of combustion. The arrangement is such that the deposits of carbon or the like can not accumulate upon the other exposed surfaces of the drums, due to the action of heat thereon. The apparatus is extremely simple and economical in the consumption of fuel.

Figure 1:
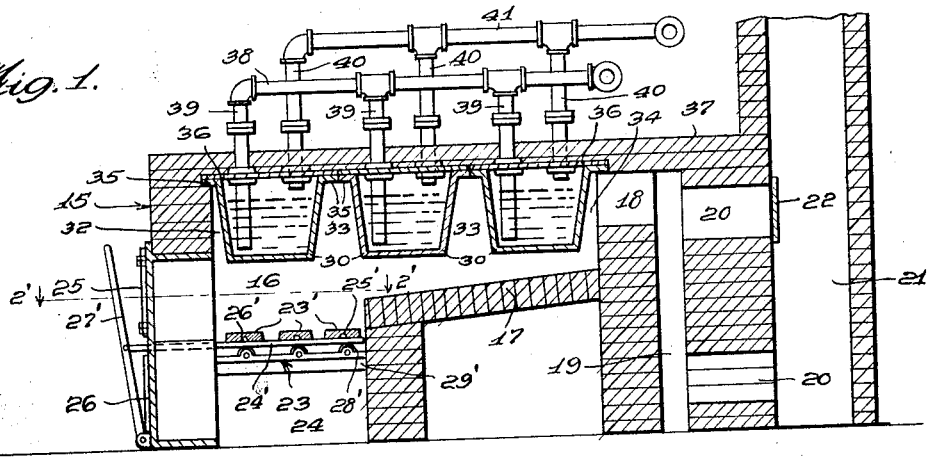
Figure 2:
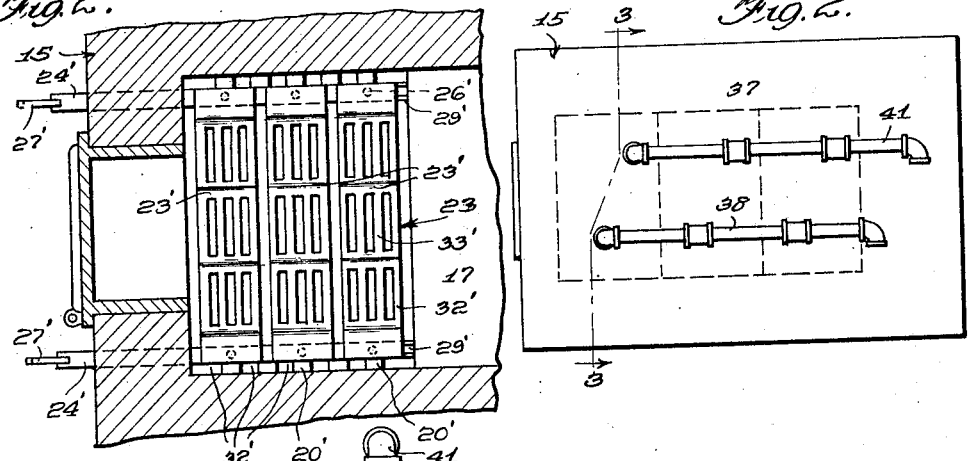
Figure 3:
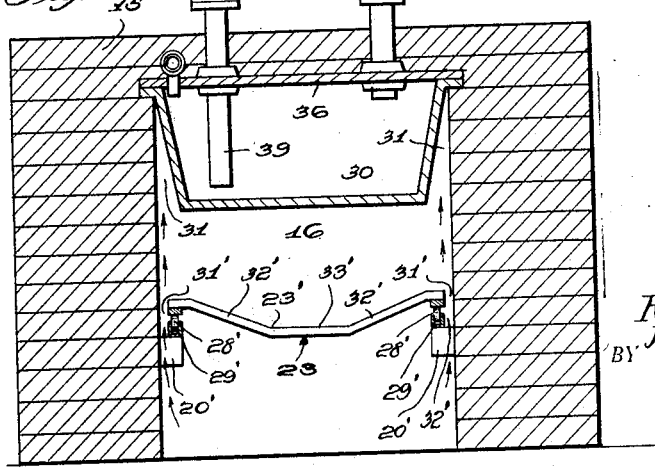
Figure 7:
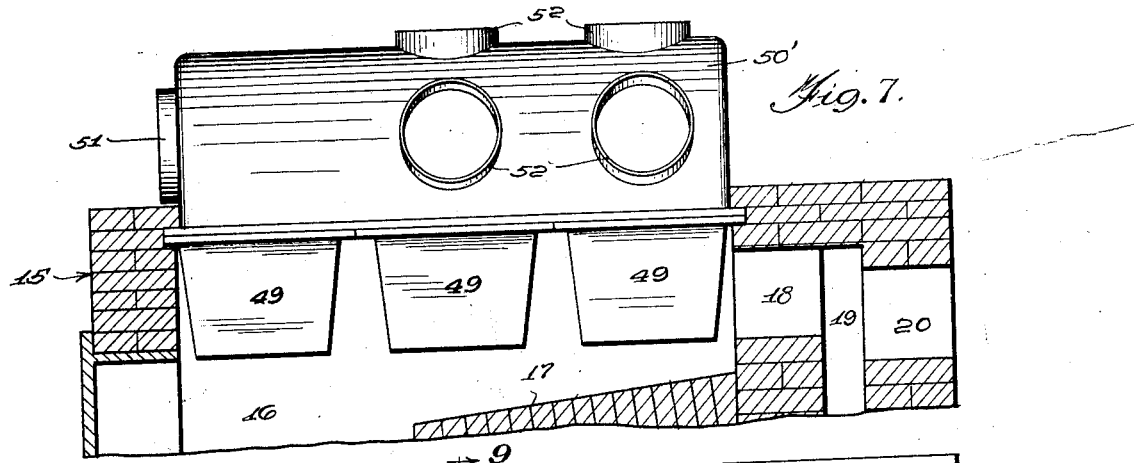
Figure 8:
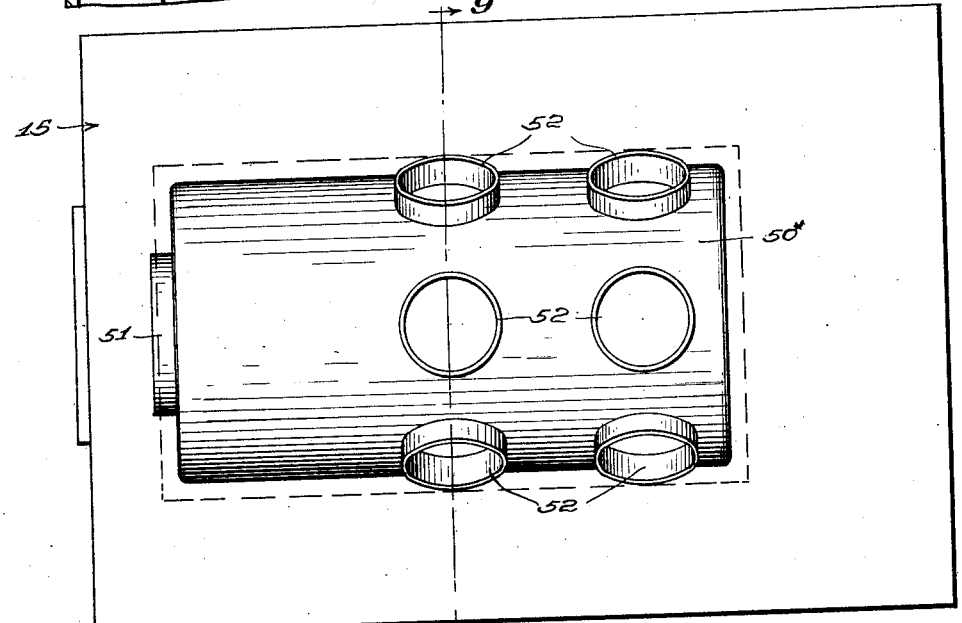
Figure 9:
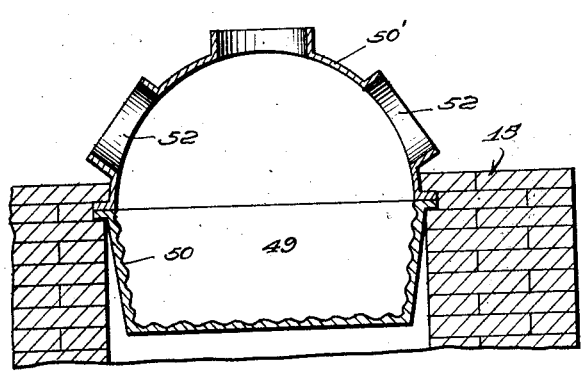

In the accompanying drawings, forming a part of this specification, and in which like numerals are employed to designate like parts throughout the same, Figure 1 is a central vertical longitudinal section through a hot water furnace embodying our invention, Figure 2 is a plan view of the same, Figure 2' is a horizontal section taken on line 2'—2' of Figure 1, Figure 3 is a transverse section taken on line 3—3 of Figure 2, Figure 4 is a central vertical longitudinal section through a steam furnace embodying the invention parts in elevation, Figure 5 is a plan view of the same, Figure 6 is a transverse section taken on line 6—6 of Figure 5, Figure 7 is a central vertical longitudinal section through a hot air furnace embodying our invention parts in elevation, Figure 8 is a plan view of the same, and, Figure 9 is a transverse section taken on line 9—9 of Figure 8.

In the drawings, wherein for the purpose of illustration are shown preferred embodiments of our invention, the numeral 15 designates a furnace casing, as a whole which may be formed of brick or any other suitable refractory material. This casing embodies a combustion chamber 16, which extends forwardly over an inclined bridge wall 17, whereby the products of combustion discharge through an opening 18. This opening leads into a vertical passage 19, having communication with upper and lower openings 20, leading into a stack 21. The opening 20 may be covered and uncovered by a damper 22, which is preferably horizontally sliding. When the damper 22 is closed, the products of combustion travel downwardly through the vertical passage 19 and through the lower opening 20 into the stack 21. This somewhat retards the discharge of the products of combustion, whereby their period of contact with the drums, to be described, is prolonged. When the damper 22 is opened, the products of combustion pass through the upper opening 20 directly into the stack 21. In the three forms of the invention, a grate 23 is arranged at the bottom of the combustion chamber 16, providing the usual ash pit. The grate embodies a number of grate sections 23' arranged upon the tops of horizontal shaker bars 24' and having notches 25' formed in their lower faces, to receive lugs 26', formed in the shaker bars. These shaker bars are reciprocated by levers 27'. The shaker bars are supported by rollers 28', resting within channel irons 29'. These channel irons are supported upon bricks 20'. These bricks are spaced, providing openings 32' therebetween, and the channel irons 29', shaker bars 26', and grate sections 23' are all spaced from the side walls of the combustion chamber, providing vertical passages 31'. These passages permit of ashes or the like falling therethrough and also for the vertical passage of air, adjacent to the side walls of the combustion chamber, for a purpose to be described. Each grate section preferably has downwardly inclined intermediate portions 32' and a central horizontal portion 33'. The inclined portions 32', function to feed the major portion of the ashes and cinders to the central portion of the grate, away from the side walls of the combustion chamber, thereby aiding in keeping open the vertical air passages at the side walls of the combustion chamber.

The combustion chamber and ash pit are provided with the usual doors 25 and 26, whereby access may be had to the same.

Attention being invited to Figures 1 to 3, inclusive, the numeral 30 designates a plurality of drums, which are inverted frusta-conical in vertical transverse and longitudinal sections. These drums are sufficiently long so that their large upper ends fill the transverse area of the combustion chamber, providing upwardly tapering passages 31, at the ends of the drums. The foremost drum 30 provides an upwardly tapering passage 32 between its side and the end wall of the furnace casing. The drums 30 provide between their sides upwardly tapering passage 33 and the rearmost drum affords a passage 34, with the end wall of the furnace. The several drums are provided at their upper large ends with rectangular outwardly projecting flanges 35, which engage with each other and with the walls of the furnace casing, effecting a gas-tight joint. The drums have their tops covered by plates 36, bolted or otherwise secured thereto, and these plates may be covered by refractory material 37. Particular attention is called to the fact that the plates 36, constituting the tops of the drums, are completely covered and separated from the interior of the combustion chamber, whereby soot, ashes or the like can not accumulate upon these plates, while the sides, ends and bottoms of the drums are adapted to be completely surrounded or covered by the products of combustion, by virtue of the passages 31, 32, 33 and 34.

The numeral 38 designates a water supply pipe, connected with risers 39, passing through the plates 36 and leading to the bottoms of the drums. Risers 40 pass through the plates 36 and lead into the tops of the drums 30, and these risers are connected with a common outlet pipe 41.

In the form of the invention shown in Figures 4, 5 and 6, a steam boiler is illustrated. The same drums 33 are employed, having the same surrounding passages, and these drums are mounted in the same manner in the top of the furnace casing. The plates 36 are omitted and the flanged ends of hoods 42, are bolted or rigidly attached to the flanges 35 of the drums 33. These hoods have their lower portions completely surrounded by a cover of refractory material 43 and hence they are completely cut off from communication from the combustion chamber and soot, ashes or the like can not become deposited thereon.

The numeral 44 designates a water supply pipe, leading into one drum 42 and water is supplied to the other drums through the medium of pipes 45 having branches 46. Steam escapes from the drums 42 through risers 47, connected with a common discharge pipe 48.

In the hot air furnace shown in Figures 7, 8 and 9, the numeral 49 designates drums, substantially identical with the drums 33, excepting that the interiors of the same are corrugated, as shown at 50. These drums are of the same exterior shape as the drums 33 and the same passages surround the same, as described in connection with the drums 33. The drums 49 are mounted in the furnace casing in the same manner as described in connection with the drums 33. Arranged upon the tops of the drums 49 is a common hood 50', having a lower flanged end which may be bolted or otherwise rigidly attached to the upper flanged ends of the drums 49. The hood 50' is completely cut off from communication with the interior of the combustion chamber and hence soot, ashes or the like can not be deposited thereon. The hood 50' is preferably curved in cross section, as shown.

The operation of the first form of apparatus is as follows:

The coal or like fuel is supported upon the grate sections 23 and ignited thereon. The heated gases and products of combustion pass upwardly and forwardly within the combustion chamber and enter the passages 31, 32, 33 and 34, thus completely surrounding or enveloping the drums. The maximum heat exchange is, therefore, effected with the exposed faces or walls of the drums, and soot or the like will not accumulate upon these faces, as the same is burned therefrom. During the combustion of the fuel ascending currents of air pass upwardly through the vertical passages 31', and into the side passages 31, in which secondary combustion occurs, providing an intense heat which maintains the adjacent walls of the drums clean. If the damper 22 is opened, the products of combustion pass directly into the stack 21, for providing a quick draft. If it should be desired to retard the travel of the products of combustion, from proximity to the drums, the damper 22 is closed and the products of combustion will then pass downwardly through the vertical passage 19 and hence into the bottom of the stack. The water heated within the drums 30 will, of course, circulate in the usual manner.

The operation of the modifications of the invention as shown in Figures 4 to 6, inclusive, and 7 to 9, inclusive, are so similar to that stated in connection with the first form of the invention, that it is thought that no further description need be given.

It is to be understood that the forms of our invention, herewith shown and described, are to be taken as preferred examples of the same, and that various changes in the shape, size and arrangement of parts may be resorted to without departing from the spirit of our invention or the scope of the subjoined claims.

Having thus described our invention, we claim:

1. In a furnace of the character described, a furnace casing providing a combustion chamber having side walls, drum means arranged within the upper portion of the combustion chamber and having its top completely separated from the combustion chamber and its end walls spaced from said side walls providing passages for the reception of products of combustion, inlet and outlet means for said drum means, a movable grate arranged within the combustion chamber beneath the drum means, said grate having outer inclined portions extending downwardly toward its center to deflect material toward the same, and means providing substantially vertical air passages arranged outwardly of the grate and in substantial alinement with said side passages.

2. In a furnace of the character described, a furnace casing providing a combustion chamber having side walls, generally horizontally arranged drums within the upper portion of the combustion chamber, said drums being generally inverted frusta-conical, in vertical transverse and longitudinal sections providing passages between the drums and passages between the ends of the drums and the side walls of the furnace, the end passages being adapted for receiving products of combustion, supporting elements arranged in the lower portion of the combustion chamber and providing passages in alinement with the end passages for supplying air thereto for secondary combustion, a movable grate arranged upon the supporting elements and having its ends spaced from the side walls of the combustion chamber, whereby the ascending air passes freely upwardly outwardly of the grate, said grate having outer portions which are inclined downwardly toward the center of the grate, to deflect material toward the same, whereby such material will not clog the vertical passages, and means to move the grate.

In testimony whereof we affix our signatures.

ROLLAND M. BARBOUR.
HENRY H. KNIPE.